United States Patent
Ou-Yang et al.

(10) Patent No.: US 8,200,029 B2
(45) Date of Patent: Jun. 12, 2012

(54) GRAY CODE ENCODING AND DECODING METHOD APPLIED TO HOLOGRAPHIC STORAGE DEVICES

(75) Inventors: Mang Ou-Yang, Hsinchu (TW); Yu-Ta Chen, Hsinchu (TW); Ching-Cherng Sun, Hsinchu (TW); Tsung-Hsun Yang, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 1148 days.

(21) Appl. No.: 12/071,414

(22) Filed: Feb. 21, 2008

(65) Prior Publication Data

US 2009/0214126 A1    Aug. 27, 2009

(51) Int. Cl.
*G06K 9/36* (2006.01)
(52) U.S. Cl. .......................................... 382/232; 369/21
(58) Field of Classification Search .......... 382/232–253; 359/1–35
See application file for complete search history.

(56) References Cited

U.S. PATENT DOCUMENTS

| 5,450,218 | A | * | 9/1995 | Heanue et al. | 359/21 |
| 5,740,184 | A | * | 4/1998 | Heanue et al. | 714/746 |
| 7,055,080 | B2 | * | 5/2006 | Roh et al. | 714/757 |
| 7,441,703 | B2 | * | 10/2008 | Moon et al. | 235/454 |
| 2003/0046629 | A1 | * | 3/2003 | Roh et al. | 714/757 |
| 2006/0285469 | A1 | * | 12/2006 | Tonami | 369/103 |

* cited by examiner

*Primary Examiner* — Bhavesh Mehta
*Assistant Examiner* — Sean Motsinger
(74) *Attorney, Agent, or Firm* — Rosenberg, Klein & Lee

(57) ABSTRACT

A gray code encoding and decoding method applied to holographic storage devices is proposed. The encoding method uses gray levels of a 2D detector to encode a certain amount of original bits of the original data, and then sends them to a spatial light modulator (SLM) for encryption. The decoding method corrects the received gray levels to the original gray levels, and then compares the maximum gray level with the original gray levels to decode the original gray level into binary data. The proposed encoding and decoding method can better make use of storage locations of the 2D detector and get a code rate close to 1.

28 Claims, 5 Drawing Sheets

GRAY CODE ENCODING AND DECODING METHOD APPLIED TO HOLOGRAPHIC STORAGE DEVICES

BACKGROUND OF THE INVENTION

1. Field of the Invention

The present invention relates to a gray code encoding and decoding method and, more particularly, to a gray code encoding and decoding method applied to holographic storage devices.

2. Description of Related Art

Holographic storage devices make use of a kind of optical storage technique to store a large amount of binary data, and have high transmission speeds.

As shown in FIG. 1, U.S. Pat. No. 6,549,664 discloses a holographic storage device to store data. This holographic storage device comprises a spatial light modulator (SLM) 16, an optical component 13, and a storage medium 20. The SLM 16 has a page 18 with millions of pixels. A signal beam 10 carrying data is encrypted by the SLM 16 and is then illuminated onto the storage medium 20. A reference beam 12 is also incident upon the storage medium 20 to interfere with the signal beam 10 and generate an interference pattern that is recorded in the storage medium 20. The page 18 can thus be stored as a hologram in the storage medium 20.

FIG. 2 shows a prior art apparatus for retrieving a holographically stored page from the storage medium 20. As shown in FIG. 2, an address beam 15 identical to the reference beam 12 is incident upon the storage medium 20 to produce an image beam 22. The image beam passes through an optical component 21 and is then incident upon a 2D detector 24. The 2D detector 24 has detector pixels 26, which can produce electronic signals corresponding to the received image beam 22. Therefore, holograms stored in the storage medium 20 can be built on the 2D detector 24.

Next, the 2D detector 24 decodes the received hologram. The condition for determining "0" or "1" of the 2D detector 24 disclosed in the U.S. Pat. No. 6,549,664 is achieved by predefining the number of 1's in the hologram. The remaining regions are all 0's. There are no error correction rules between blocks. This manner, however, wastes part of recording positions of the 2D detector for encoding. Moreover, the problem of code rate exists.

Accordingly, the present invention aims to propose a gray code encoding and decoding method more perfectly applied to holographic storage devices so as to solve the above limits and drawbacks in the prior art.

SUMMARY OF THE INVENTION

An object of the present invention is to provide a gray code encoding method and decoding method applied to holographic storage devices. The proposed methods encode original bits of original data according to a third-dimension gray level of a 2D detector, correct wrong gray levels to original gray levels, and decode them to get original binary data, thereby reducing errors when performing error correction code (ECC) to the 2D detector, lowering the probability of exceeding the minimum correctable range of ECC, and enhancing the data storage capacity of the storage area. The problem of code rate can thus be improved, and no more than four storage locations of the 2D detector will be wasted.

To achieve the above object, the present invention provides a gray code encoding method applied to holographic storage devices, which comprises the steps of: providing a binary original data having a plurality of original bits; adding a first start bit, a second start bit and an end bit into the binary original data to form a bit array, defining gray levels of the first start bit, the second start bit, and the end bit respectively as a first start gray level gray(1), a second start gray level gray(2), and an end gray level, wherein gray(1) and gray(2) differ by a certain gray level $\Delta$; and retrieving a certain amount of the original bits from the original data and performing gray code encoding to this certain amount of the original bits according to the first start bit, the second start bit, the end bit, gray(1), gray (2), and the end gray level.

To achieve the above object, the present invention also provides a gray code decoding method applied to holographic storage devices, which comprises the steps of: defining a maximum gray level, a first start gray level gray(1), and a second start gray level gray(2) with gray(1) and gray(2) differing by a certain gray level $\Delta$; receiving a gray level data and correcting the gray level data to original gray levels according gray(1), gray(2) and the maximum gray level; decoding the original gray levels into a binary original data according to the maximum gray level by determining the original data to be a binary digit of "1" when the original gray level is larger than a half of the maximum gray level and determining the original data to be a binary digit of "0" when the original gray level is smaller than a half of the maximum gray level.

BRIEF DESCRIPTION OF THE DRAWINGS

The various objects and advantages of the present invention will be more readily understood from the following detailed description when read in conjunction with the appended drawing, in which.

DETAILED DESCRIPTION OF THE PREFERRED EMBODIMENTS

Figure 1:
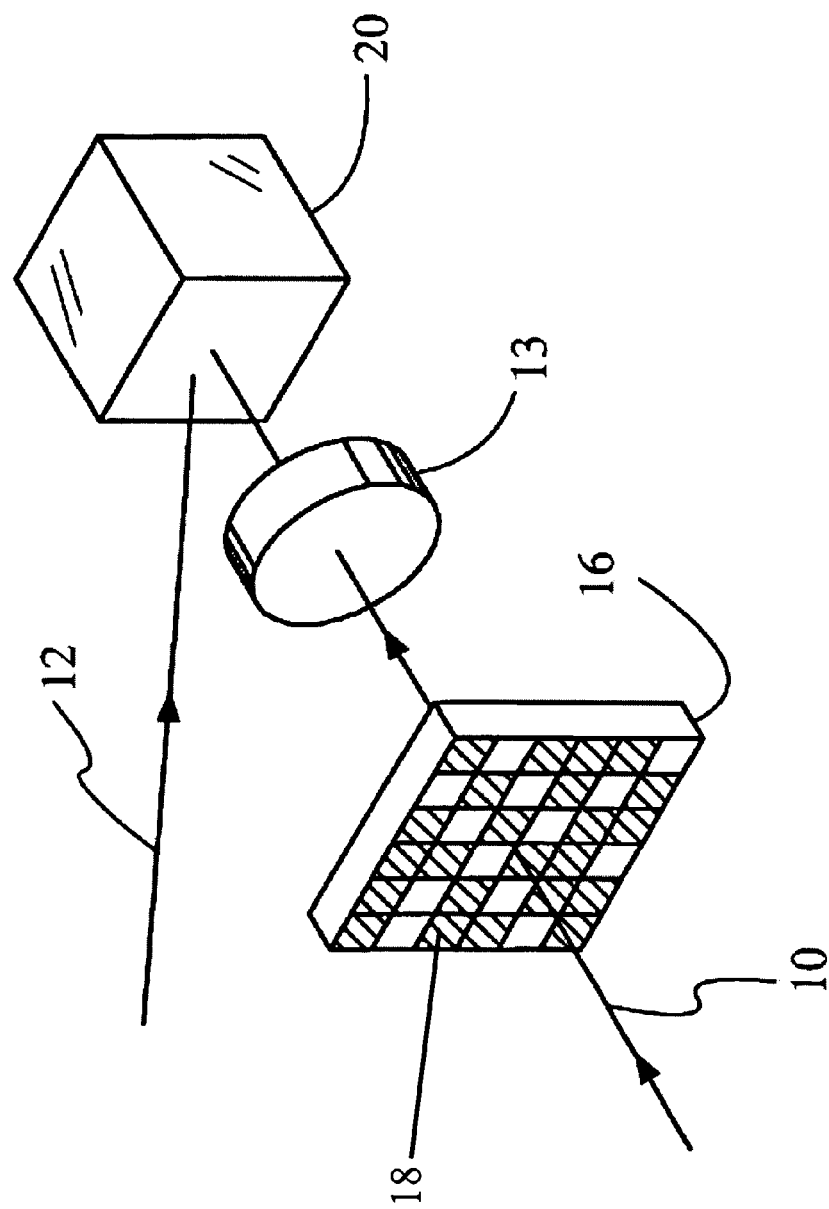
FIG. 1 shows a prior art apparatus for holographically storing a data page.
Figure 2:
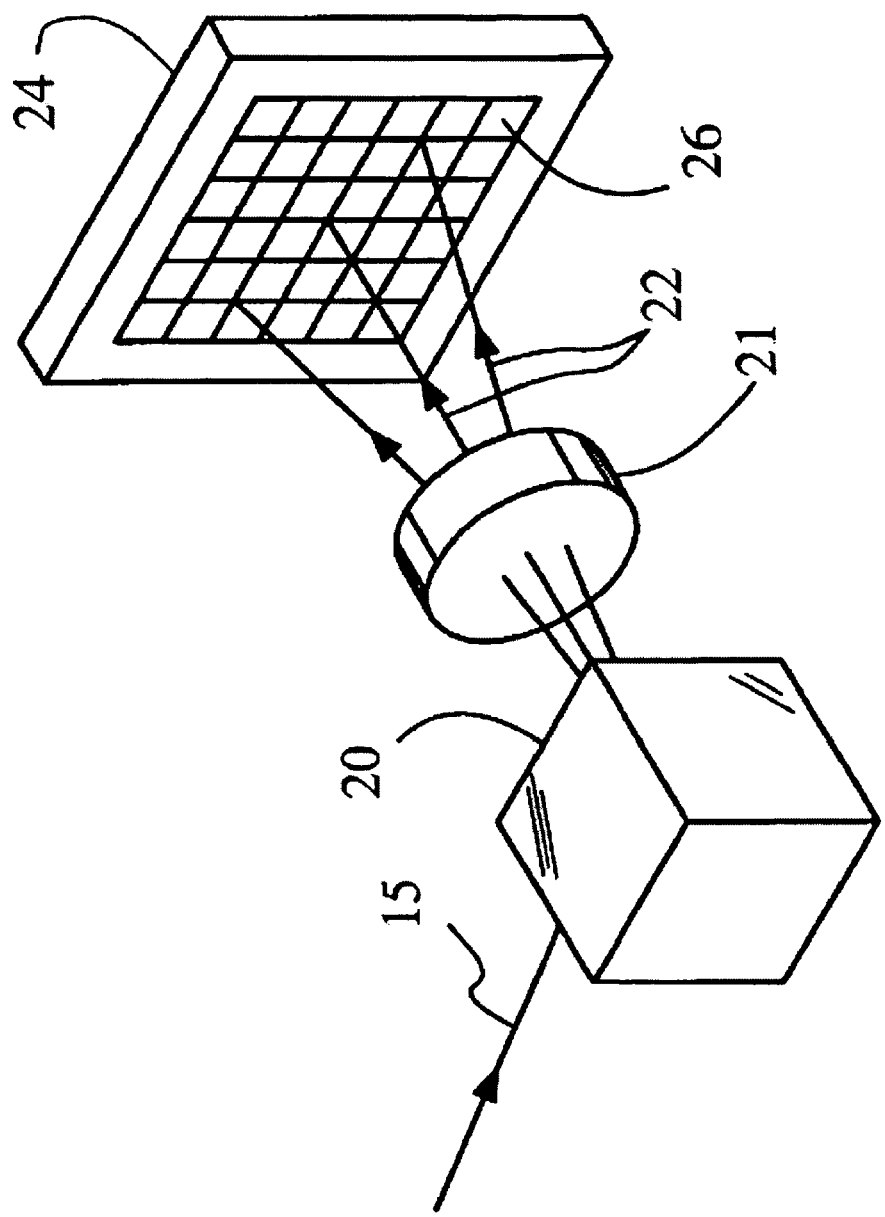
FIG. 2 shows a prior art apparatus for retrieving a holographically stored page.
Figure 3:
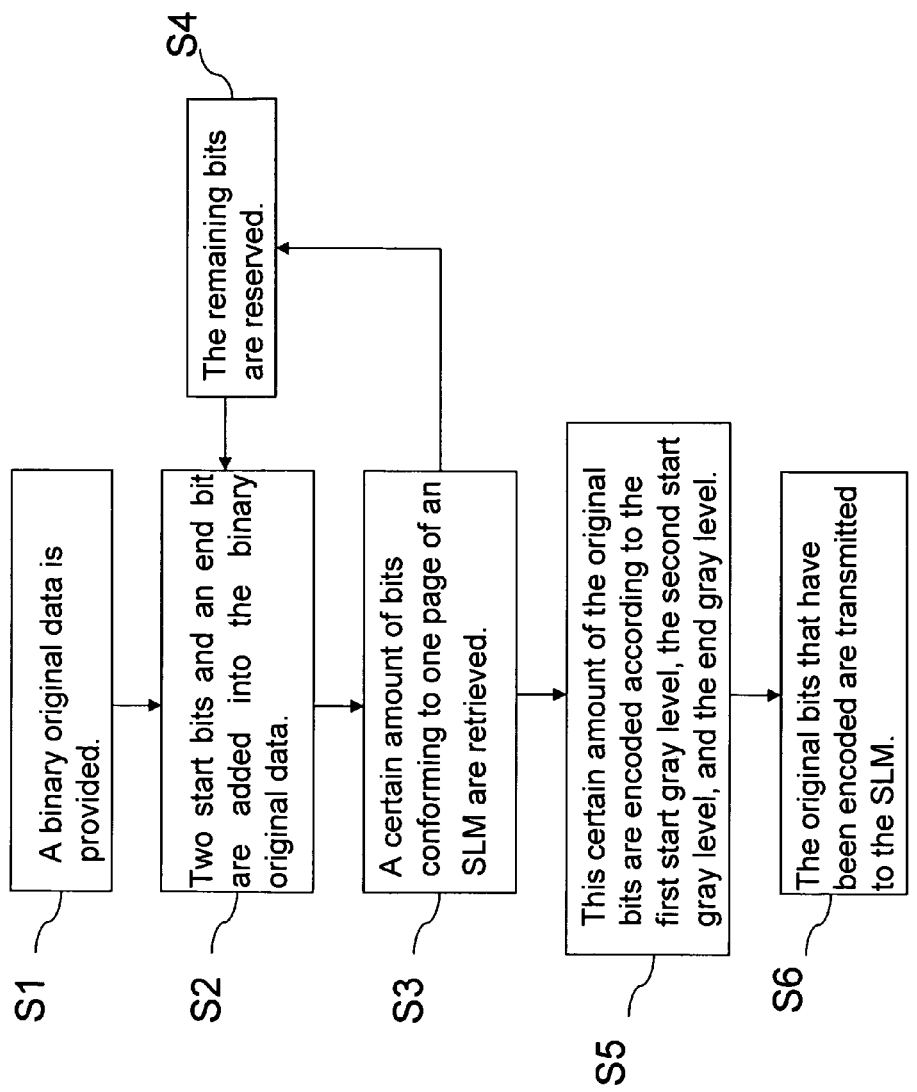
FIG. 3 is a flowchart of the gray code encoding method applied to holographic storage devices of the present invention.

FIG. 3 is a flowchart of the gray code encoding method applied to holographic storage devices of the present invention. Reference is made to FIG. 3 as well as FIGS. 1 and 2. The encoding method of the present invention discloses the encoding process before binary data are transmitted to an SLM 16 for encryption and then translated into bright and dark dots. A page 18 of the SLM 16 is assumed to be able to store data of n pixels. A 2D detector 24 is assumed to have N bits, and thus has $2^N$ gray levels. The maximum gray level is $2^N-1$. The gray level $2^{N-1}$ is the threshold of "0" and "1" of the original data.

First, a binary original data having a plurality of original bits (e.g., 01011 . . . ) is provided (Step S1). A first start bit b(1), a second start bit b(2), and an end bit b(n) are then added into the binary original data to form a bit data array (Step S2). The first start bit b(1), the second start bit b(2), and the end bit b(n) are known, and their gray levels are a first start gray level gray(1), a second start gray level gray(2), and an end gray level gray(n), respectively. The gray(1) and gray (2) differ by a certain gray level $\Delta$. Next, a certain amount of the original bits are retrieved from the binary original data (Step S3). The total bit number of this certain amount of the original bits, the first start bit, the second start bit, and the end bit is smaller than or equal to the bit number n of the page 18 of the SLM 16. If there are remaining original bits, they are reserved in the bit data array (Step S4). Subsequently, gray code encoding is performed to this certain amount of original bits according to the first start gray level gray(1), the second start gray level gray(2), and the end gray level gray(n) (Step S5). Finally, the original bits that have been gray code encoded are transmitted to the SLM 16 for encryption (Step S6).

The gray code encoding rules for this amount of original bits will be further illustrated below. A bit of this amount of the original bits and its subsequent two adjacent bits are assumed to be b(i), b(i+1), and b(i+2), and gray levels of b(i), b(i+1) and b(i+2) are defined as gray(i), gray(i+1) and gray(i+2). Assume that the first start bit b(1)=0, the second start bit b(2)=0, and the end bit b(n)=0.

A. When gray(2)>gray(1), i.e., gray(2)=gray(1)+Δ, the following gray code encoding rules need to be met:
   I. If b(i)=b(i+1), then gray(i+1)=gray(i)±Δ:
      If b(i)=b(i+1)=0, then gray(i+1)=gray(i)+Δ;
      If b(i)=b(i+1)=1, then gray(i+1)=gray(i)−Δ.
   II. If b(i)≠b(i+1), then gray(i+1)=the maximum gray level−gray(i)=($2^N$−1)−gray(i):
      If b(i)=0 and b(i+1)=1, then gray(i+1)=($2^N$−1)−gray(i);
      If b(i)=1 and b(i+1)=0, then gray(i+1)=($2^N$−1)−gray(i).

B. When gray(2)<gray(1), i.e., gray(2)=gray(1)−Δ, the following gray code encoding rules need to be met:
   I. If b(i)=b(i+1), then gray(i+1)=gray(i)+Δ:
      If b(i)=b(i+1)=0, then gray(i+1)=gray(i)−Δ;
      If b(i)=b(i+1)=1, then gray(i+1)=gray(i)+Δ.
   II. If b(i)≠b(i+1), then gray(i+1)=the maximum gray level−gray(i)=($2^N$−1)−gray(i):
      If b(i)=0 and b(i+1)=1, then gray(i+1)=($2^N$−1)−gray(i);
      If b(i)=1 and b(i+1)=0, then gray(i+1)=($2^N$−1)−gray(i).

Figure 4:
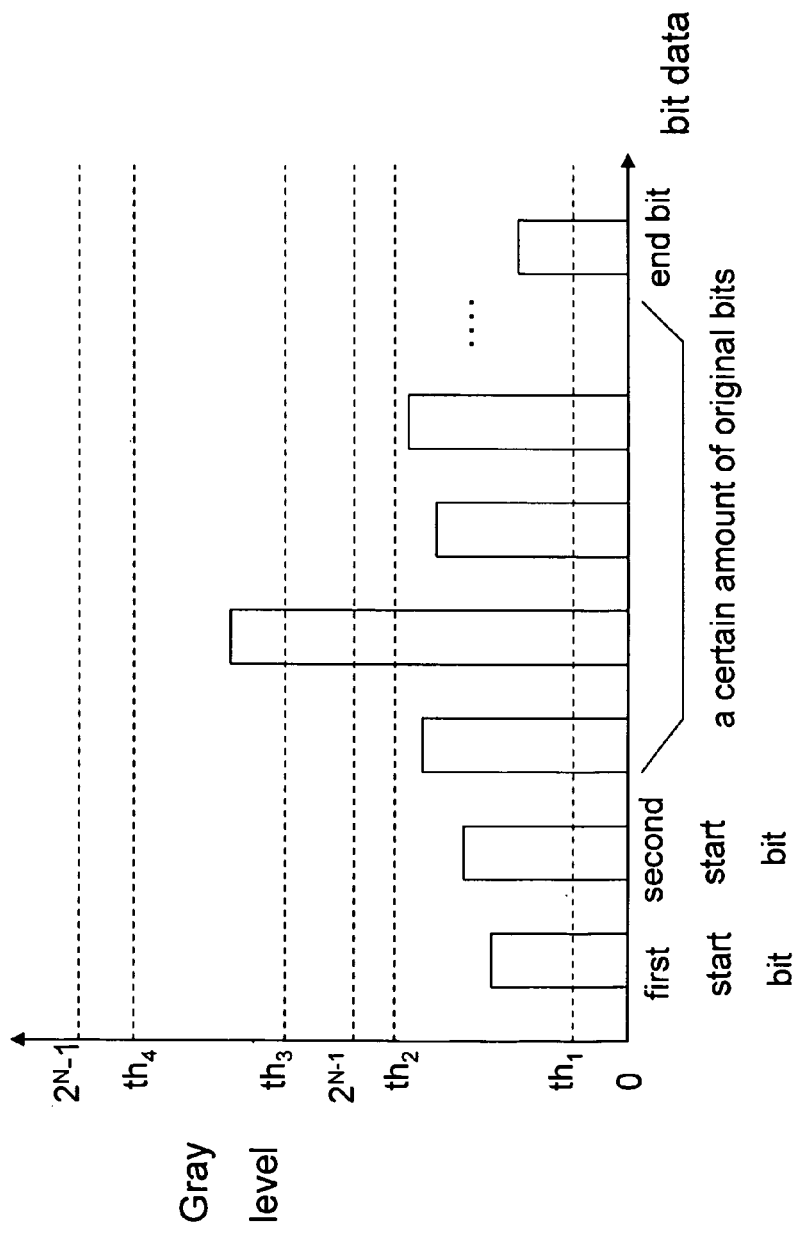
FIG. 4 is a bar chart of bit versus gray level of the present invention.

With the above two encoding rules A and B, gray levels in transition situations are defined. That is, each original bit b(i) has $2^N$ gray levels, and four gray thresholds, a first gray threshold $th_1$, a second gray threshold $th_2$, a third gray threshold $th_3$, and a fourth gray threshold $th_4$, $0<th_1<th_2<2^{N-1}<th_3<th_4<2^N-1$, are defined for these $2^N$ gray levels. FIG. 4 is a bar chart of bit versus gray level of the present invention, in which:
   I. When b(i)=b(i+1), if the gray level gray(i) exceeds the threshold, i.e., gray(i)☐$th_1$ or $th_2$☐gray(i)<$2^{N-1}$ or $2^{N-1}$<gray(i)<$th_3$ or $th_4$☐gray(i)<$2^N$−1, then gray(i+1)=gray(i).
   II. When b(i)=b(i+1)=b(i+2), if gray(i)=gray(i+1)☐$th_1$ or $th_3$>$2^{N-1}$, then gray(i+2)=gray(i+1)+Δ.
   III. When b(i)=b(i+1)=b(i+2), if gray(i)=gray(i+1)☐$th_4$ or $th_2$<$2^{N-1}$, then gray(i+2)=gray(i+1)−Δ.

Figure 5:
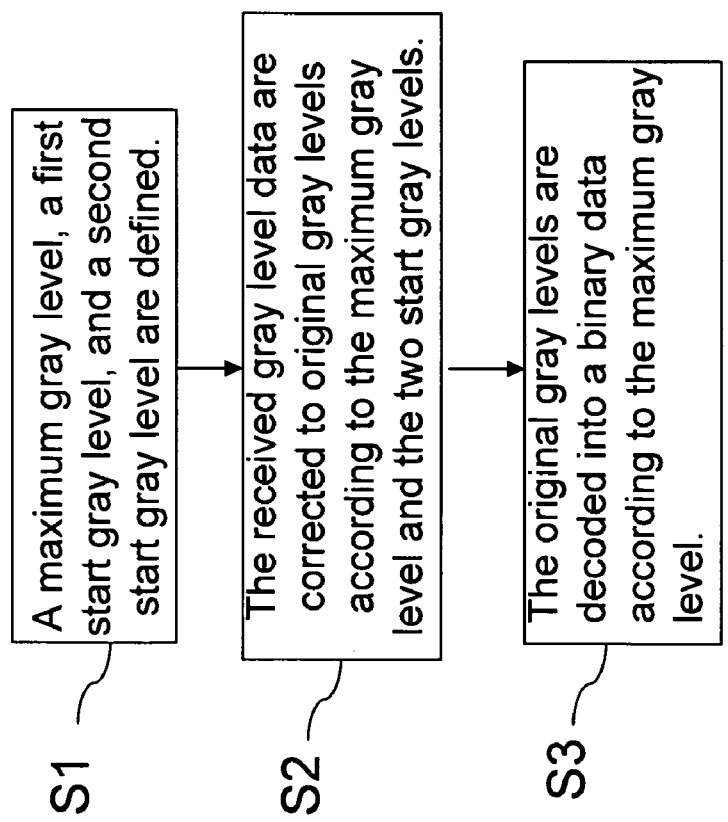
FIG. 5 is a flowchart of the gray code decoding method applied to holographic storage devices of the present invention.

FIG. 5 is a flowchart of the gray code decoding method applied to holographic storage devices of the present invention. Reference is made to FIG. 3 as well as Figs. The decoding method of the present invention decodes the gray level gray(i) received by the 2D detector 24. The 2D detector 24 has N bits, and thus has $2^N$ gray levels with a maximum gray level of $2^N$−1. In the decoding method, a maximum gray level $2^N$−1, a first start gray level gray(1), and a second start gray level gray(2) are defined with gray(1) and gray(2) differing by a certain gray level Δ (Step S1). The 2D detector 24 then corrects the received gray level data to original gray levels according to gray(1), gray(2), and the maximum gray level $2^N$−1 (Step S2). Next, the original gray levels are decoded into a binary data (e.g., 0101 . . . ) according to the maximum gray level (Step S3). When the original gray level is larger than $2^{N-1}$ (a half of the maximum gray level), the original data is determined to be a binary digit of "1"; when the original gray level is smaller than $2^{N-1}$ (a half of the maximum gray level), the original data is determined to be a binary digit of "0".

The decoding rules of the present invention for gray levels will be further illustrated below. A gray level of the gray level data and its two adjacent gray levels are defined as gray(i), gray(i−1) and gray(i+1):
   When |gray(i)−gray(i−1)|≦Δ, if |gray(i)−gray(i−1)|≦Δ or ($2^N$−1−gray(i))=gray(i+1), then gray(i)=gray(i−1)+Δ;
   When ($2^N$−1−gray(i))=gray(i−1), if |gray(i)−gray(i+1)|≦Δ or ($2^N$−1−gray(i))=gray(i+1), then gray(i)=$2^N$−1−gray(i−1).

With the above decoding rules, thresholds in transition situations are defined. There are $2^N$ gray levels in the gray level data, and four gray thresholds, a first gray threshold $th_1$, a second gray threshold $th_2$, a third gray threshold $th_3$, and a fourth gray threshold $th_4$, $0<th_1<th_2<2^{N-1}<th_3<th_4<2^N-1$, are defined for these $2^N$ gray levels. A gray level of the gray level data and its two adjacent gray levels are defined as gray(i), gray(i−1) and gray(i+1):
   When gray(i)=gray(i−1) and gray(i) is one of the four gray thresholds but gray(i−2) is not one of the four gray thresholds, then gray(i)=gray(i−2)=the threshold;
   When gray(i−2)=gray(i−1)=$th_1$ and gray(i)<$2^N$, then gray(i)=gray(i−1)+Δ;
   When gray(i−2)=gray(i−1)=$th_2$ and gray(i)<$2^N$, then gray(i)=gray(i−1)−Δ;
   When gray(i−2)=gray(i−1)=$th_3$ and gray(i)>$2^N$, then gray(i)=gray(i−1)+Δ;
   When gray(i−2)=gray(i−1)=$th_4$ and gray(i)>$2^N$, then gray(i)=gray(i−1)−Δ.

To sum up, the present invention discloses a gray code encoding method and decoding method applied to holographic storage devices. The proposed methods make use of a third-dimension gray level of a 2D detector for encoding and decoding to reduce errors when performing error correction code (ECC) to the 2D detector, lower the probability of exceeding the minimum correctable range of ECC, and enhance the data storage capacity of the storage area. Not only errors between pixels can be corrected, the problem of code rate can also be improved. Moreover, storage locations of the 2D detector won't be wasted.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

We claim:

1. A gray code encoding method applied to holographic storage devices comprising the steps of:
   providing a binary original data having a plurality of original bits;
   adding a first start bit, a second start bit and an end bit into said binary original data to form a bit data array, defining gray levels of said first start bit, said second start bit and said end bit respectively as a first start gray level gray(1), a second start gray level gray(2), and an end gray level wherein gray(1) and gray(2) differ by a certain gray level Δ; and
   retrieving a certain amount of said original bits from said original data and performing gray code encoding to said certain amount of said original bits according to said first start bit, said second start bit, said end bit, gray(1), gray (2), and said end gray level.

2. The gray code encoding method as claimed in claim 1, wherein the total bit number of said certain amount of said original bits, said first start bit, said second start bit and said end bit is smaller than or equal to the bit number of one page of an SLM, and said certain amount of said original bits that have been encoded are sent to said SLM.

3. The gray code encoding method as claimed in claim 1, wherein if gray(2) is larger than gray(1), gray(2)=gray(1)+Δ, a bit of said certain amount of said original bits and its subsequent two adjacent bits are defined as b(i), b(i+1), and b(i+2), and gray levels of said b(i), b(i+1) and b(i+2) are defined as gray(i), gray(i+1) and gray(i+2).

4. The gray code encoding method as claimed in claim 3, wherein when b(i)=b(i+1), gray(i+1)=gray(i)±Δ.

5. The gray code encoding method as claimed in claim 4, wherein when b(i)=b(i+1)=0, gray(i+1)=gray(i)+Δ; b(i)=b(i+1)=1, gray(i+1)=gray(i)−Δ.

6. The gray code encoding method as claimed in claim 3, wherein b(i)≠b(i+1), gray(i+1)=the maximum gray level−gray(i).

7. The gray code encoding method as claimed in claim 1, wherein if gray(2) is smaller than gray(1), gray(2)=gray(1)−Δ, a bit of said certain amount of said original bits and its subsequent two adjacent bits are defined as b(i), b(i+1), and b(i+2), and gray levels of said b(i), b(i+1) and b(i+2) are defined as gray(i), gray(i+1) and gray(i+2).

8. The gray code encoding method as claimed in claim 7, wherein when b(i)=b(i+1), gray(i+1)=gray(i)+Δ.

9. The gray code encoding method as claimed in claim 8, wherein when b(i)=b(i+1)=0, gray(i+1)=gray(i)−Δ; when b(i)=b(i+1)=1, gray(i+1)=gray(i)+Δ.

10. The gray code encoding method as claimed in claim 7, wherein b(i)≠b(i+1), gray(i+1)=the maximum gray level−gray(i).

11. The gray code encoding method as claimed in claim 3, wherein each of said original bits has $2^N$ gray levels, and four gray thresholds, a first gray threshold, a second gray threshold, a third gray threshold and a fourth gray threshold, are defined for the $2^N$ gray levels, and 0<said first gray threshold<said second gray threshold<$2^{N-1}$<said third gray threshold<said fourth gray threshold<$2^N-1$.

12. The gray code encoding method as claimed in claim 11, wherein when b(i)=b(i+1), if gray(i)≦said first gray threshold, or said second gray threshold≦gray(i)<$2^{N-1}$, or $2^{N-1}$<gray(i)<said third gray threshold, or said fourth gray threshold<gray(i)<$2^N-1$, then gray(i+1) gray(i).

13. The gray code encoding method as claimed in claim 11, wherein when b(i)=b(i+1)=b(i+2), if gray(i)=gray(i+1)≦said first gray threshold, or said third gray threshold>$2^{N-1}$, then gray(i+2)=gray(i+1)+Δ.

14. The gray code encoding method as claimed in claim 11, wherein when b(i)=b(i+1)=b(i+2), if gray(i)=gray(i+1)≧said fourth gray threshold, or said second gray threshold<$2^{N-1}$, then gray(i+2)=gray(i+1)−Δ.

15. The gray code encoding method as claimed in claim 7, wherein each of said original bits has $2^N$ gray levels, and four gray thresholds, a first gray threshold, a second gray threshold, a third gray threshold and a fourth gray threshold, are defined for the $2^N$ gray levels, and 0<said first gray threshold<said second gray threshold<$2^{N-1}$<said third gray threshold<said fourth gray threshold<$2^N-1$.

16. The gray code encoding method as claimed in claim 15, wherein when b(i)=b(i+1), if gray(i)≦said first gray threshold, or said second gray threshold≦gray(i)<$2^{N-1}$, or $2^{N-1}$<gray(i)<said third gray threshold, or said fourth gray threshold≦gray(i)<$2^{N-1}$, then gray(i+1)=gray(i).

17. The gray code encoding method as claimed in claim 15, wherein when b(i)=b(i+1)=b(i+2), if gray(i)=gray(i+1)≦said first gray threshold, or said third gray threshold>$2^{N-1}$, then gray(i+2)=gray(i+1)+Δ.

18. The gray code encoding method as claimed in claim 11, wherein when b(i)=b(i+1)=b(i+2), if gray(i)=gray(i+1)≧said fourth gray threshold, or said second gray threshold<$2^{N-1}$, then gray(i+2)=gray(i+1)−Δ.

19. A gray code decoding method applied to holographic storage devices comprising the steps of:
defining a maximum gray level, a first start gray level gray(1), and a second start gray level gray(2) with gray (1) and gray(2) differing by a certain gray level Δ;
receiving a gray level data and correcting said gray level data to original gray levels according gray(1), gray(2), and said maximum gray level; decoding said original gray levels into a binary original data according to said maximum gray level by determining said original data to be a binary digit of "1" when said original gray level is larger than a half of said maximum gray level and determining said original data to be a binary digit of "0" when said original gray level is smaller than a half of said maximum gray level.

20. The gray code decoding method as claimed in claim 19, wherein a gray level of said gray level data and its two adjacent gray levels are defined as gray(i), gray(i−1) and gray(i+1), when |gray(i)−gray(i−1)|≦Δ, if |gray(i)−gray(i−1)|≦Δ or (said maximum gray level−gray(i))=gray(i+1), then gray(i)=gray(i−1)+Δ.

21. The gray code decoding method as claimed in claim 19, wherein a gray level of said gray level data and its two adjacent gray levels are defined as gray(i), gray(i−1) and gray(i+1), when (said maximum gray level−gray(i))=gray(i−1), if |gray(i)−gray(i+1)|≦Δ or (said maximum gray level−gray(i))= gray(i+1), then gray(i)=said maximum gray level−gray(i−1).

22. The gray code decoding method as claimed in claim 19, wherein said gray level data has $2^N$ gray levels, and four gray thresholds, a first gray threshold, a second gray threshold, a third gray threshold and a fourth gray threshold, are defined for the $2^N$ gray levels, and 0<said first gray threshold<said second gray threshold<$2^{N-1}$<said third gray threshold<said fourth gray threshold<$2^N-1$.

23. The gray code decoding method as claimed in claim 22, wherein a gray level of said gray level data and its subsequent two adjacent gray levels are defined as gray(i), gray(i−1), and gray(i−2), when gray(i)=gray(i−1) and gray(i) is one of said four gray thresholds but gray(i−2) is not one of said four gray thresholds, then gray(i)=gray(i−2)=threshold.

24. The gray code decoding method as claimed in claim 22, wherein a gray level of said gray level data and its subsequent two adjacent gray levels are defined as gray(i), gray(i−1), and gray(i−2), when gray(i−2)=gray(i−1)=said first gray threshold and gray(i)<$2^N$, then gray(i)=gray(i−1)+Δ.

25. The gray code decoding method as claimed in claim 22, wherein a gray level of said gray level data and its subsequent two adjacent gray levels are defined as gray(i), gray(i−1), and gray(i−2), when gray(i−2)=gray(i−1)=said second gray threshold and gray(i)<$2^N$, then gray(i)=gray(i−1)−Δ.

26. The gray code decoding method as claimed in claim 22, wherein a gray level of said gray level data and its subsequent two adjacent gray levels are defined as gray(i), gray(i−1), and gray(i−2), when gray(i−2)=gray(i−1)=said third gray threshold and gray(i)>$2^N$, then gray(i)=gray(i−1)+Δ.

27. The gray code decoding method as claimed in claim 22, wherein a gray level of said gray level data and its subsequent two adjacent gray levels are defined as gray(i), gray(i−1), and gray(i−2), when gray(i−2)=gray(i−1)=said fourth gray threshold and gray(i)>$2^N$, then gray(i)=gray(i−1)−Δ.

28. The gray code decoding method as claimed in claim 19, wherein a 2D detector is used to receive said gray level data.

* * * * *